(12) United States Patent
Deveau-Greene et al.

(10) Patent No.: US 9,961,920 B2
(45) Date of Patent: May 8, 2018

(54) SYSTEM AND METHOD FOR MANUFACTURING PET TREATS BY HIGH-PRESSURE PROCESSING

(71) Applicant: JBS USA, LLC, Greeley, CO (US)

(72) Inventors: Rebecca Deveau-Greene, Denver, CO (US); LaWayne Larson, Fort Collins, CO (US)

(73) Assignee: JBS USA, LLC, Greeley, CO (US)

( * ) Notice: Subject to any disclaimer, the term of this patent is extended or adjusted under 35 U.S.C. 154(b) by 0 days. days.

(21) Appl. No.: 15/140,060

(22) Filed: Apr. 27, 2016

(65) Prior Publication Data

US 2016/0316788 A1    Nov. 3, 2016

Related U.S. Application Data

(60) Provisional application No. 62/155,942, filed on May 1, 2015.

(51) Int. Cl.
| | | |
|---|---|---|
| *A23K 1/10* | (2006.01) | |
| *A23K 10/26* | (2016.01) | |
| *A23K 50/40* | (2016.01) | |
| *A23N 17/00* | (2006.01) | |
| *A23K 40/00* | (2016.01) | |

(52) U.S. Cl.
CPC .............. *A23K 10/26* (2016.05); *A23K 40/00* (2016.05); *A23K 50/40* (2016.05); *A23N 17/002* (2013.01)

(58) Field of Classification Search
CPC ........ A23K 10/20; A23K 10/26; A23K 40/00; A23K 50/40; A23K 50/42
See application file for complete search history.

(56) References Cited

U.S. PATENT DOCUMENTS

| | | | |
|---|---|---|---|
| 2005/0147719 A1* | 7/2005 | Hill | A23K 40/30 426/132 |
| 2010/0034936 A1* | 2/2010 | Marsden | A23L 3/0155 426/237 |
| 2011/0076929 A1* | 3/2011 | Summerfield | A22B 5/0058 452/71 |
| 2014/0186499 A1* | 7/2014 | Hukelmann | A22C 7/0046 426/231 |

OTHER PUBLICATIONS

The Cattle Site NPL, published Oct. 27, 2006, http://www.thecattlesite.com/articles/744/beef-cattle-implants/ (Year: 2006).*

* cited by examiner

*Primary Examiner* — Drew E Becker
*Assistant Examiner* — Bryan Kim
(74) *Attorney, Agent, or Firm* — Sheridan Ross P.C.

(57) ABSTRACT

Systems and methods for processing cattle ears into pet treats by high-pressure processing are provided. The cattle ears are covered with a liquid, such as water, and exposed to high hydrostatic pressures for about one minute. The high hydrostatic pressures remove hair and implants from the cattle ears while preserving the texture and consistency of the ears, which are appealing to dogs and other pets.

19 Claims, 8 Drawing Sheets

SYSTEM AND METHOD FOR MANUFACTURING PET TREATS BY HIGH-PRESSURE PROCESSING

RELATED APPLICATIONS

This application is a continuation of U.S. Provisional Patent Application Ser. No. 62/155,942 filed on May 1, 2015. The entire disclosure of the prior application is considered to be part of the disclosure of the accompanying application and is hereby incorporated by reference.

FIELD OF THE INVENTION

This disclosure relates to systems and methods for manufacturing pet treats, and in particular to systems and methods for high-pressure processing of cattle ears to produce the pet treats.

DESCRIPTION OF THE RELATED ART

Previously, as part of the process of slaughtering cattle for meat, the ears of the cattle were generally discarded as an unwanted byproduct because they cannot be used for meat and have relatively few other uses. More recently, the potential of cattle ears as treats or toys for dogs and other pets has been recognized, but processing the ears into a form that is acceptable to both consumers and dogs, in volumes large enough to be commercially viable, has proven difficult.

At least two methods of processing cattle ears have previously been known and described in the art. These methods produce "white ears" and "golden ears," respectively.

As it is used by those skilled in the art, the term "white ears" refers to cattle ears that have been subjected to processes similar to those which produce automotive leather from cattle hides. Although processing cattle ears into white ears is cost-effective, white ears have a tofu-like texture and consistency which make them unappealing to dogs and other pets. White ears have thus found relatively little use as pet treats and toys.

As it is used by those skilled in the art, the term "golden ears" refers to cattle ears that have been baked after being removed from the cattle carcass. Golden ears have an improved texture and consistency as compared to white ears, but because golden ears are subjected to relatively little handling before being baked, they are not stripped of hair, or, more significantly, of the growth implants commonly inserted into the ears of beef cattle by cattle ranchers.

Those skilled in the art have attempted to skirt the problem posed by the growth implants in several ways. Sorting of ears, such that only those that are free of implants are processed into golden ears, has been attempted, but is difficult and risky. Other methods of physically removing the implants before processing, such as by cutting, melting, or scraping, are time-consuming and are often unsuccessful. Although implants are generally found only in the ears of steers, excluding steer ears from processing and restricting the golden-ear process solely to cow ears generates large quantities of waste and does not allow for sufficient volume to be commercially viable.

High-pressure processing (HPP) is currently used as a means of sterilizing food products, most commonly for use as lunchmeats or raw dog foods. In HPP, a food product is sealed and placed into a compartment containing a liquid, often water, and pumps are used to create pressure. The pumps may apply pressure constantly or intermittently. The application of high hydrostatic pressures on a food product kills many microorganisms. However, HPP has not previously been applied to cattle ears, because the ears have not been used as part of a food product and therefore need not be sterilized.

There is thus a long-felt need for cost-effective systems and methods for processing cattle ears into treats or toys for dogs and other pets, in such a way as to remove hair and growth implants from the ears while maintaining a texture and consistency that are appealing to dogs and other pets. It is also advantageous for such systems and methods to process cattle ears without use of chemicals more costly or environmentally destructive than water, which is not only efficient but results in a product that is more appealing to both dogs and other pets, and their owners. It is still further advantageous for such systems and methods to require minimal cleanup and minimal time, so as to produce a larger volume of pet treats.

BRIEF SUMMARY OF THE INVENTION

The invention provides a method for manufacturing an item for a pet, comprising removing a cattle ear from a cattle carcass, placing the cattle ear into a heat-sealable compartment or container, covering the cattle ear in the heat-sealable compartment or container with a liquid, heat-sealing the heat-sealable compartment or container, and subjecting the cattle ear to a hydrostatic pressure of at least about 60 psi for at least about one minute.

In embodiments, hair that is on the cattle ear before the subjecting step falls off of the cattle ear during the subjecting step, or can be washed off or wiped off of the cattle ear after the subjecting step.

In embodiments, an implant that is in the cattle ear before the subjecting step is pushed out of the cattle ear during the subjecting step.

In embodiments, an implant that is in the cattle ear before the subjecting step is crushed or pulverized during the subjecting step.

In embodiments, the item is at least one of a chew, a toy, or a treat.

In embodiments, the pet is a dog.

In embodiments, the heat-sealable compartment or container is a nylon bag.

In embodiments, the liquid is water.

In embodiments, the hydrostatic pressure is between about 60 psi and about 85 psi. In an embodiment, the pressure is one of about 60 psi, about 75 psi, about 80 psi, and about 85 psi.

The invention also provides a system for manufacturing an item for a pet, comprising a cattle ear, removed from a cattle carcass; a liquid, covering the cattle ear; a heat-sealable compartment or container, receiving the cattle ear and the liquid and being heat-sealed after receiving the cattle ear and the liquid; and a pump, subjecting the cattle ear to a hydrostatic pressure of at least about 60 psi for at least about one minute after the heat-sealable compartment or container is heat-sealed.

In embodiments, hair on the cattle ear falls off, or can be washed off or wiped off, of the cattle ear as a result of the hydrostatic pressure.

In embodiments, an implant in the cattle ear is pushed out of the cattle ear as a result of the hydrostatic pressure.

In embodiments, an implant in the cattle ear is crushed or pulverized as a result of the hydrostatic pressure.

In embodiments, the item is at least one of a chew, a toy, and a treat.

In embodiments, the hydrostatic pressure is between about 60 psi and about 85 psi. In an embodiment, the hydrostatic pressure is one of about 60 psi, about 75 psi, about 80 psi, and about 85 psi.

The invention further provides a method for removing material from a cattle ear, comprising placing the cattle ear in a heat-sealable compartment or container, covering the cattle ear in the heat-sealable compartment or container with a liquid, heat-sealing the heat-sealable compartment or container, and subjecting the cattle ear to a hydrostatic pressure of at least about 60 psi for at least about one minute.

In embodiments, the material is hair.

In embodiments, the material is at least one implant.

These and other advantages will be apparent from the disclosure contained herein.

For purposes of further disclosure and to comply with applicable written description and enablement requirements, the following references generally relate to systems and methods for manufacturing pet chews, foods, toys, and treats; for sealing or securing organics or plastics; and for related systems and methods, and are hereby incorporated by reference in their entireties:

U.S. Pat. No. 2,910,066, entitled "Thread for the production of knotted ligatures, more especially for surgical purposes and particularly for the ligaturing of blood vessels during operations," issued 27 Oct. 1959 to Kammer ("Kammer"). Kammer describes a ligature carrier to which a pre-looped ligature is detachably attached, so that it can be immediately transferred to a suitable ligaturing instrument capable of tightening the pre-looped ligature into a double knot on a blood vessel. Kammer also describes a ligature carrier including a plate which may remain directly on the surgical instrument as a protection for the ligature during the tying operation. Kammer further describes a ready-looped ligature arrangement including a supporting plate and a ligature, which can be prepared in non-sterilized condition, and then sterilized in large numbers while the ligature remains on the supporting plate.

U.S. Pat. No. 4,259,361, entitled "For foods, feeds, and fertilizers," issued 31 Mar. 1981 to Procter ("Procter"). Procter describes a process for the production of dehydrated foodstuffs, feedstuffs, or plant fertilizers including the following steps: (a) preparing protein-containing animal matter to a particulate size acceptable to homogenizing equipment; (b) subjecting the comminuted matter to ultra homogenization; (c) heating the resultant homogenate to a temperature of between about 50° C. and 85° C. to agglomerate the protein; (d) granulating the agglomerate; (e) drying the granules at a temperature not greater than 95° C. until their moisture content is within the range of about 20% to about 50% by weight; (f) passing the partially dried granules through a mincer to form kibbles; and (g) drying the kibbled material to achieve a moisture content not more than 8% by weight.

U.S. Pat. No. 5,897,893, entitled "For dogs; bone core with an outer tubular wrapper of tubular animal viscera, or extruded tubular jerky, to better motivate a dog to chew and clean its teeth," issued 27 Apr. 1999 to Mohilef ("Mohilef"). Mohilef describes a pet chew comprising an inner bone or bone-like core, and at least one outer edible tubular wrapper layer composed of dried animal viscera or other tubular food product compositions.

U.S. Pat. No. 6,277,420, entitled "Combination rawhide and formulated pet food chew," issued 21 Aug. 2001 to Andersen et al. ("Andersen"). Andersen describes a highly palatable and long lasting dog chew for pets, developed by combining a formulation and processing sequence which results in a highly palatable meat based filling being incorporated into the center of a preformed rawhide stick or rawhide roll. Such outside rawhide fraction is extremely tough and chewy which results in a dog chew which takes a long period of time for the dog to consume. The inside meat filling is highly palatable which results in the animal maintaining interest in the treat until nearly the entire chew has been consumed. The interior meat filling is preserved by reduced water activity to below 0.85 as a result of incorporation of salt, sugars, and natural humectants. The filling is formulated and processed in such a manner that the water phase is bound within the filling and does not pass by capillary action to the outside rawhide fraction. This results in the outer rawhide shell maintaining a tough and chewable texture until such point as the dog is offered the finished chew.

U.S. Pat. No. 6,488,690, entitled "Suture knot sealing instruments and methods of using the same," published 3 Dec. 2002 to Morris et al. ("Morris"). Morris describes a hand-held instrument coagulating suture knots for enhanced security, preferably applying heat to thermoplastic materials. The instrument includes a proximal end adapted for gripping by a user, and a distal tip with a heating element activated by a user control. A knot-retaining feature is provided which allows the tool to function as a knot slider or pusher prior to sealing. The retaining feature may be a fork-shaped element, or may include a surface in communication with a tube, channel, or groove, enabling one or more strands of suture material to be dressed away from the tip when heated. The electrical conductors used to activate the heating element at the tip of the tool may be bipolar or unipolar, in which case the body of the patient is utilized as the return electrical path through a grounding pad. The tool may be entirely self-contained and battery operated, and the distal portion of the tool may be provided as a removable insert to existing Bovie instruments.

U.S. Pat. No. 6,895,900, entitled "Animal chew toy," issued 24 May 2005 to Hingst ("Hingst"). Hingst describes a chew toy for a carnivorous domestic animal comprising a combination of rawhide and pigskin formed into a suitable shape, such as a bone, roll, donut, or various other shapes. The rawhide and pigskin are provided as sheets which are rolled or otherwise sandwiched together or otherwise intertwined to form a chew toy having improved flavor and order, thereby encouraging the animal to chew on the toy.

U.S. Patent Application Publication No. 2006/0243219, entitled "Pet chew toy," published 2 Nov. 2006 to Brown ("Brown"). Brown describes a pet chew toy including a relatively hard outer shell formed of dried and shaped animal skin. A relatively soft flavored and scented meat product is encapsulated within the outer shell. The meat product promotes aggressive sustained chewing of the toy to exercise the jaws of the pet and clean its teeth and gums.

U.S. Patent Application Publication No. 2007/0288249, entitled "Integrated animal management system and method," published 13 Dec. 2007 to Rowe et al. ("Rowe"). Rowe describes a system for the intensive management of animals, comprising animal identification means for identifying individual animals; at least one device for measuring one or more parameters of individual animals; a processor for processing measurements obtained for the one or more parameters, wherein the processed parameter data is used to determine strategies for individual animals in real-time; and means for implementing management strategies for the animals.

U.S. Patent Application Publication No. 2009/0004338, entitled "Adhesion system for rawhide and meat chew for dogs," published 1 Jan. 2009 to Anderson et al. ("Anderson I"). Anderson I describes a palatable and long lasting chew for dogs combining a rawhide fraction with meat, poultry, or fish. The rawhide fraction is from rawhide splits die cut into desired shapes. The rawhide fraction is then dehydrated to approximately 6% moisture. The meat, poultry, or fish fraction then attaches to the rawhide component. The meat fraction is held to the rawhide fraction utilizing a food grade adhesive from milk protein hydrolysate. The milk protein hydrolysate is solubilized in hot water to a solids level between 3% and 30%. The solution is then applied to the rawhide component where the meat fraction will contact the rawhide. The meat fraction is then deposited onto the coated rawhide surface and the chew is then dehydrated to laminate the meat fraction to the rawhide fraction. Alternatively, the food grade adhesive is blended with the meat fraction and deposited in the rawhide.

U.S. Pat. No. 7,691,426, entitled "Providing an animal chew formed of rawhide and edible resin; resin may be positioned on the outer surface of the rawhide and/or retained within the rawhide; resin may include one or a mixture of starch, gluten, vegetable protein, carbohydrate, or fat," issued 6 Apr. 2010 to Axelrod et al. ("Axelrod"). Axelrod describes an animal chew formed of rawhide and edible resin. The edible resin may be positioned on the outer surface of the rawhide and/or retained within the rawhide. The edible resin may include one or a mixture of starch, gluten, vegetable protein, carbohydrate, or fat.

U.S. Pat. No. 8,042,493, entitled "Containment vessel for teething and eating," issued 25 Oct. 2011 to Jacobs ("Jacobs I"). Jacobs I describes a containment vessel for teething and feeding including an elongate object having axially opposed end portions, a central portion extending between the end portions, and a mesh pouch attached to the central portion. The pouch has an opening, which can be closed when the pouch is attached to the elongate object. The pouch can have a flap which is wrapped around the central portion and attached to the pouch prior to placing an object in the bag and closing the opening. In an alternative, the opening of the pouch is captured between inside surfaces of a two-part object. The elongate object preferably resembles a bone, the vessel being especially suitable for dogs.

U.S. Pat. No. 8,074,609, entitled "Rawhide edible chew with pizzle inner member and method for making the same," issued 13 Dec. 2011 to Adkins ("Adkins"). Adkins describes a rawhide chew with a pizzle inner member. The rawhide chew includes a rawhide outer layer formed of a rawhide sheet. The rawhide outer layer comprises a hole cut therethrough to form a cut-out window. The pizzle is positioned within the rawhide outer layer such that the pizzle is externally viewable through the cut-out window. Further, the pizzle is rolled within the rawhide outer layer such that no edges of the pizzle protrude through the cut-out window.

U.S. Pat. No. 8,235,974, entitled "Method for hair removal," issued 7 Aug. 2012 to Wagnieres et al. ("Wagnieres"). Wagnieres describes a method for hair removal from a skin area by selective photo-inactivation of the pilo-sebaceous apparatus using derivatives of ALA with alkylene-glycol chains. Selectivity of the method is further enhanced by treatment of the epidermis by agents reducing PpIX levels in the epidermis. Side effects are diminished by using short drug/light intervals.

U.S. Pat. No. 8,393,301, entitled "Containment vessel for teething and eating," issued 12 Mar. 2013 to Jacobs ("Jacobs II"). Jacobs II describes a containment vessel for teething and feeding including an elongate object having axially opposed end portions, a central portion extending between the end portions, and a mesh pouch attached to the central portion. The pouch has an opening, which can be closed when the pouch is attached to the elongate object. The pouch can have a flap which is wrapped around the central portion and attached to the pouch prior to placing an object in the bag and closing the opening. In an alternative, the opening of the pouch is captured between inside surfaces of a two-part object. The elongate object preferably resembles a bone, the vessel being especially suitable for dogs.

U.S. Pat. No. 8,449,937, entitled "Edible pet chew and preparation of same," issued 28 May 2013 to Chen et al. ("Chen"). Chen describes a pet chew including an outer layer and an inner layer, the outer and inner layers being laminated and rolled into a cylindrical shape having knots at both ends, the outer layer including, in weight percent, 28 to 49 percent plant-based material, at least 30 percent meat-based material and at least 20 percent animal hide-based material. Chen also describes preparation methods.

U.S. Pat. No. 8,479,687, entitled "Braided pet chew," issued 9 Jul. 2013 to Anderson et al. ("Anderson II"). Anderson II describes a highly palatable and long lasting chew for dogs developed by braiding a combination of rawhide and bull, or steer, penis, known in the trade as puzzles. The pizzle is sourced directly from slaughter and the foreskin may be removed. Bleached rawhide splits are cut into rectangular pieces and rolled to form a rope-like strand equal in length to the pizzle. Strands of three to eight sections are then woven together to form an elongated braid. Such braids are then hung on racks and undergo a cooking and dehydration step to reduce the moisture content below 10% moisture. The resultant dehydrated sticks are then cut into lengths suitable for offering as a chew for dogs. Such chew is highly palatable because of the dehydrated pizzle. The chew has a very long chew time because of the dense leathery nature of the dehydrated rawhide fraction.

U.S. Patent Application Publication No. 2014/0044838, entitled "Edible pet chew and method for making the same," published 13 Feb. 2014 to Xu ("Xu I"). Xu I describes an edible pet chew having a chewy sheet member of meat based material. The meat based material chewy sheet imitates the durability and strength properties of known rawhide sheet and simultaneously has inherent attraction to dogs due to the meat in its formula. The edible pet chew may have a single chewy sheet of meat based material, or a meat based material chewy sheet member and additionally an edible material member being wrapped therein, or an edible material member and additionally a meat based material chewy sheet member being wrapped therein. Xu II also describes a method for making the edible pet chew with the essential member of a meat based material chewy sheet.

German Patent Application Publication No. 10/2012/017617, entitled "Device for direct processing of slaughter by-products with other wastewater recycling and energy recovery in various places, having compact device into which slaughter by-products are conveyed and processed into finished products," published 6 Mar. 2014 to Gleich ("Gleich"). Gleich describes a device having a hermetically sealed compact device into which slaughter by-products are conveyed and processed into finished products in a closed tubing and container system without a contact of raw materials. Pest infestation of the slaughter by-products is precluded for finished product quality. Tissue decomposition is enabled due to depositions of nested pests. A liquid phase is sedimented in fat receptacles. Exhaust air is cleaned in a bio filter. A decompression of a process air flow from a sterilizer is carried out in a capacitor.

U.S. Pat. No. 8,776,728, entitled "Edible pet chew," issued 15 Jul. 2014 to Xu ("Xu II"). Xu II describes an edible pet chew for pets, primarily dogs, having a chewy sheet of meat based material. The meat based chewy sheet imitates the chewy property and function of known rawhide sheet, and thus the meat based chewy sheet can be substituted for the rawhide sheet in a pet chew. In order to achieve the chewy property, a necessary additive is used to form the meat based material. The meat based chewy sheet is then formed into a pet chew with various shapes and structures similarly to known rawhide sheet. Another member of edible chewable material, preferably chicken jerky, can be wrapped into the meat based chewy sheet to further enhance attraction or nutrition to dogs. Instead of a chewy sheet, a three-dimensional-shape chewy mass can be introduced, wrapping or containing another member of edible chewable material, preferably chicken jerky, in the chewy mass member.

U.S. Patent Application Publication No. 2014/0255553, entitled "Edible pet chew and method for making the same," published 11 Sep. 2014 to Xu ("Xu III"). Xu III describes an edible pet chew having a member of meat based material. The edible pet chew may have a chewy sheet of meat based material, or a meat based material chewy sheet member and additionally an edible material member being wrapped therein, or an edible material member and additionally a meat based material chewy sheet member being wrapped therein, or a three-dimensional-shape meat based material member and additionally an edible material member wrapped therein, or an edible material member and additionally a three-dimensional-shape meat based material member wrapped therein. Xu III also describes a method for making the edible pet chew with the essential member of a meat based material chewy sheet member or a three-dimensional-shape member.

U.S. Patent Application Publication No. 2014/0363537, entitled "Pet chew with amylase and/or protease composition," published 11 Dec. 2014 to Doerr ("Doerr"). Doerr describes a pet food product and a method for making the same. The pet food product uses a collagen casing with a filling material that contains at least one amylase. The pet food product after drying has desired levels of softness and durability so that it is an effective pet chew product.

U.S. Pat. No. 8,986,081, entitled "Device and method for processing carcasses of livestock," issued 24 Mar. 2015 to Ueffing et al. ("Ueffing"). Ueffing describes a device for processing carcasses of livestock such as cattle, pigs, and sheep, comprising at least two dressing tools for performing a dressing process on livestock carcasses and a robot arm carrying the dressing tools. Ueffing also describes a method for processing carcasses of livestock using such a device.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Brief Summary of the Invention prevails unless otherwise stated. As used herein, the term "bagging" refers to placing an item into a container or compartment. The container or compartment may be, but need not be, a bag as that term is generally understood.

As used herein, the term "covering" may refer either to submerging one or more solid items in a volume of liquid, or to adding liquid to a container or compartment containing one or more solid items, such that the liquid completely surrounds the one or more solid items taken collectively.

Figure 1:
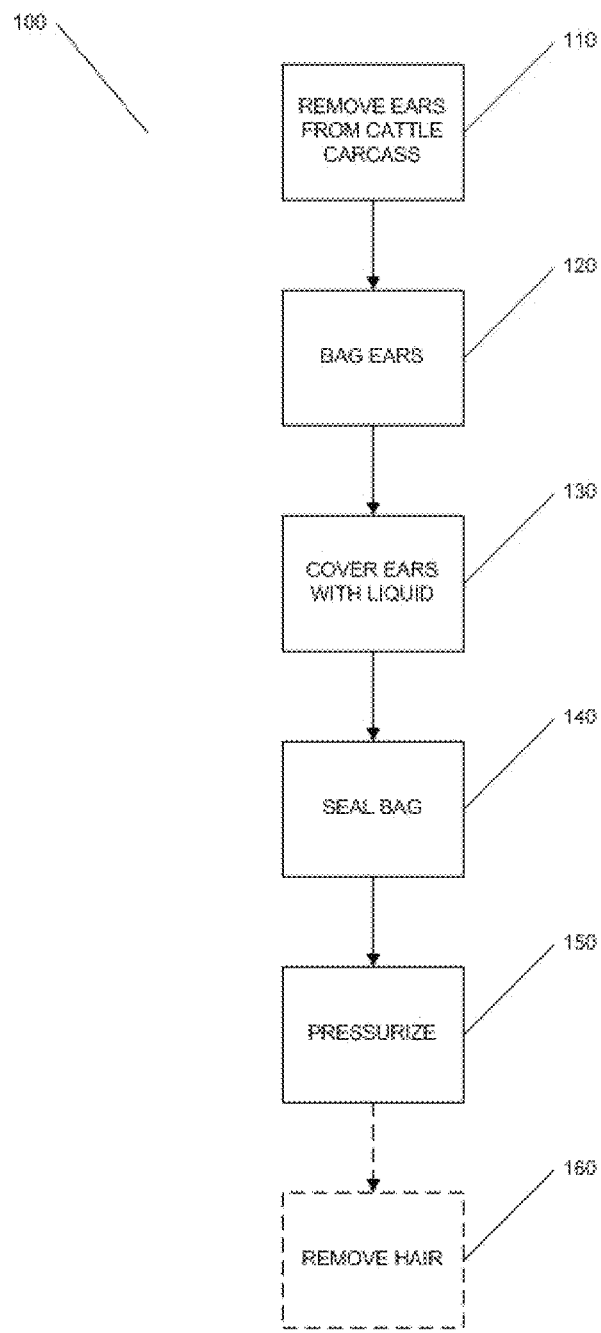
FIG. 1 is a flowchart illustrating a method for manufacturing an item for a pet according to embodiments of the present invention.

Referring now to FIG. 1, a method 100 for manufacturing an item for a pet comprises an ear removal step 110, a bagging step 120, a liquid covering step 130, a sealing step 140, and a pressurizing step 150.

In the ear removal step 110, cattle ears are removed from a cattle carcass. In embodiments, the cattle carcass will have been generated in the process of slaughtering cattle for meat.

Figure 6:
FIG. 6 is an illustration of a heat-sealable bag containing cattle ears and a liquid, according to an alternative embodiment of the present invention.

In the bagging step 120, the cattle ears are placed into a heat-sealable container or compartment. In embodiments, by way of non-limiting example, the heat-sealable container or compartment may be a nylon bag, or a plastic bag, as shown in FIG. 6 and described below. In a preferred embodiment, a particular type of nylon bag commonly referred to as a laundry bag is employed. Such bags allow for easy passage of water or another liquid into the interior of the bag, but prevent hair or other unwanted material which may be present on or in the cattle ears from flowing out of the bag.

Among other advantages, this flow characteristic can prevent fouling of, by way of non-limiting example, the internal components of a conventional HPP machine or system as known to those of ordinary skill in the art, which may be used to apply the hydrostatic pressure in the pressurizing step 150. Nylon laundry bags are additionally advantageous in that they reduce the need for cleaning or maintenance of the bags and/or HPP machines and systems employed.

In the liquid covering step 130, the cattle ears in the heat-sealable container or compartment are covered with a liquid. In embodiments, by way of non-limiting example, the liquid may be water.

In the sealing step 140, the heat-sealable container or compartment is heat-sealed. In embodiments, by way of non-limiting example, the heat-sealing may be accomplished by one or more of a hot bar sealer, a continuous heat sealer, an impulse heat sealer, a hot melt adhesive, a hot wire sealer, an induction sealer, an induction welder, or an ultrasonic welder.

In the pressurizing step 150, the cattle ears are subjected to a hydrostatic pressure of at least about 60 psi for at least about one minute. The pressurizing step 150 serves to remove unwanted material from the cattle ears while preserving the cattle ears' texture and consistency. In embodiments, by way of non-limiting example, the unwanted material may be hair, at least one implant, or combinations thereof. When the unwanted material is at least one implant, the hydrostatic pressure imposed during the pressurizing step 150 may push the implants out of the cattle ears, or crush and/or pulverize the implant. A person of ordinary skill in the art will be capable of choosing appropriate pressures and times depending on a desired application of the method, for example by choosing higher pressures and/or longer times when both hair and implants must be removed from the cattle ears as compared to when implants are not present and only hair need be removed. In embodiments, by way of non-limiting example, the hydrostatic pressure may be one of about 60 psi, about 75 psi, about 80 psi, and about 85 psi.

In some embodiments, the method may further comprise a hair removing step 160. In the hair removing step 160, any hair remaining on the cattle ears after the pressurizing step 150 is removed. In embodiments, by way of non-limiting example, the hair may be washed or wiped off of the cattle ears, either automatically by a machine or manually by a human operator. In some embodiments, all or substantially all of the hair present on the cattle ears may spontaneously fall off as a result of the pressurizing step 150, and in these embodiments the hair removing step 160 may not be necessary and may be omitted.

Figure 2:
FIG. 2 is an illustration of a cattle ear before being processed into an item for a pet.

Referring now to FIG. 2, a cattle ear is illustrated after being removed from a cattle carcass but prior to being processed into an item for a pet according to embodiments of the present invention. In the embodiment illustrated in FIG. 2, the cattle ear has been removed from the cattle carcass elsewhere and transported to an HPP facility separately from the rest of the carcass, but a person of ordinary skill in the art will understand that, in embodiments, cattle ears may be removed and processed in the same location. It would have been difficult to process this cattle ear into an item for a pet by the systems and methods of the prior art, which have had limited success in removing hair and implants from cattle ears in ways that preserve the cattle ears' appeal to dogs and other pets, and this cattle ear might have been discarded by a manufacturer of pet items utilizing such systems and methods.

Figure 3B:
FIGS. 3A and 3B are illustrations of cattle ears after being processed by a method according to embodiments of the present invention.
Figure 3A:
Figure 4:
FIG. 4 is an illustration of an operator removing hair from a cattle ear after processing by a method according to embodiments of the present invention.
Figure 5:
FIG. 5 is an illustration of a partially hairless cattle ear after being partially processed by a method according to embodiments of the present invention.

Referring now to FIGS. 3A and 3B, cattle ears that have been subjected to a method according to embodiments of the present invention are illustrated. In this embodiment, the cattle ears were placed in a nylon laundry bag and covered with water. The nylon laundry bag was heat-sealed, and the cattle ears were subjected to a hydrostatic pressure of about 80 psi for about one minute, using conventional HPP devices and systems as are known to those of ordinary skill in the art. As can be seen from FIGS. 3A and 3B, cattle ears subjected to the method of this embodiment have had at least some of the hair removed from their surfaces. As is illustrated in FIGS. 4 and 5, any remaining hair can be easily removed. Significantly, the cattle ears illustrated in FIGS. 3A and 3B are also free of any implants that may have been present prior to processing. Removal of these implants not only allows a manufacturer of pet treats to process cattle ears cheaply and in great volume, it also enables the manufacturer to utilize steer ears just as easily as cow ears. Generally, practitioners of prior art methods have found it exceedingly difficult or impossible to efficiently remove implants, making steer ears much more difficult to work with in these methods than cow ears. The availability of a wider universe of cattle ears is thus one of the advantages of the present invention.

Referring now to FIG. 4, a human operator of the system used to process the cattle ears illustrated in FIGS. 3A and 3B is illustrated manually wiping the hair from the surface of a cattle ear. A person of ordinary skill in the art will understand that subjecting the cattle ear to a hydrostatic pressure of at least about 60 psi for at least about one minute makes it substantially easier to remove hair from the surface of the ear by a simple process, such as washing or wiping. This characteristic of the present invention is advantageous because cattle ears generally must be washed before they can be cooked and finished into a chew, toy, or treat for a dog or other pet; thus, removal of remaining hair can be accomplished in a step that is already known and practiced in prior solutions. Although in the embodiment illustrated in FIG. 4, the remaining hair is removed by a human operator, a person of ordinary skill in the art will further understand that removal of the remaining hair can be accomplished automatically by machines Machines for this purpose are well known and described in the art.

Referring now to FIG. 5, a cattle ear that has been subjected to a method according to an embodiment of the present invention is illustrated. The cattle ear illustrated in FIG. 5 has had hair removed from its base and end, while hair remains affixed to a middle section of an outer surface of the ear. Removal of the remaining hair can be easily accomplished by washing or wiping, according to embodiments of the present invention.

Referring now to FIG. 6, an alternative embodiment of the methods and systems of the present invention is illustrated. In this embodiment, the heat-sealable container or compartment is a plastic bag, as opposed to the nylon laundry bag used in the embodiments illustrated in FIGS. 2-5. By way of non-limiting example, if conventional HPP devices and systems as are known to those of ordinary skill in the art are utilized, plastic and nylon bags may be particularly useful for preventing any hair that may be attached to the cattle ears from "leaking" into the HPP machine. Such "leaking" can damage or shorten the lifespan of internal components of HPP machines, and so the prevention of such "leaking" with nylon or plastic bags is an advantage of the present invention. In some embodiments, it may be advantageous to fill the heat-sealable container or compartment less than completely full of cattle ears and liquid so that, by way of non-limiting example, implants that may be present in the cattle ears have space into which they can be pushed out of the cattle ears, without damaging the bag. As illustrated in FIG. 6, the plastic bag in this embodiment has been filled roughly two-thirds full with cattle ears, and just enough water to cover the cattle ears has been added to the bag. In FIG. 6, implants that were present in the cattle ears have been successfully removed from the cattle ears by hydrostatic pressure, but the bag easily remains intact due to the negative space provided by filling the bag less than completely full.

Figure 7:
FIG. 7 is an illustration of a substantially hairless cattle ear after being completely processed by a method according to embodiments of the present invention.

Referring now to FIG. 7, a cattle ear that has been subjected to a method according to an embodiment of the present invention is illustrated. The cattle ear illustrated in FIG. 7 has had hair removed from its entire surface. This cattle ear also previously contained an implant, which has also been successfully removed by an embodiment of the systems and methods of the present invention. It would have been difficult to process this cattle ear into an item for a pet by the systems and methods of the prior art, which have had limited success in removing hair and implants from cattle ears in ways that preserve the cattle ears' appeal to dogs and other pets, and this cattle ear might have been discarded by a manufacturer of pet items utilizing such systems and methods. By contrast, the cattle ear illustrated in FIG. 7 retains, to a great extent, the same texture and consistency both before and after processing; such texture and consistency are much more enticing to dogs and other pets, and so the cattle ear illustrated in FIG. 7 represents a substantial improvement over the tofu-like white ears produced by certain earlier methods.

Figure 8:
FIG. 8 is an illustration of a pet chew manufactured by systems and methods according to embodiments of the present invention.

Referring now to FIG. 8, a finished dog chew manufactured by methods and systems according to embodiments of the present invention is illustrated. The cattle ear retains a lifelike appearance and consistency, as opposed to the tofu-like or "Styrofoam" texture and consistency from which dog chews manufactured by prior art methods, particularly "white ears," suffer. The cattle ear also retains a high degree of structural integrity, and accordingly the cattle ear can easily withstand the jostling, impacts, and other rigors of packaging and shipping for widespread sale. Additionally, as illustrated in FIG. 8, dog chews manufactured by methods and systems according to embodiments of the present invention may accurately and truthfully be marketed as "all natural" because the cattle ears do not come into contact with any synthetic additives. "All natural" items generally command a price premium in the marketplace because they are perceived as being of higher quality and/or as more environmentally friendly. Thus, the dog chew illustrated in FIG. 8 is appealing to both dogs, which are more likely to use the dog chew, and to dog owners, who are more likely to purchase dog chews made by methods and systems of the present invention. Additionally, the dog chew illustrated in FIG. 8 can be produced cost-effectively, from either steer ears or cow ears, according to embodiments of the systems and methods of the present invention. Embodiments of the present invention therefore allow those of ordinary skill in the art to make dog chews which are superior to those of the prior art, in greater volumes and at lower prices than could previously be achieved.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A method for manufacturing an item for a pet, comprising:
    placing a plurality of cattle ears in a heat-sealable compartment or container so that the container is no more than two-thirds full of said plurality of cattle ears, wherein at least one of said plurality of cattle ears is from a steer having an implant in the steer's ear;
    covering the plurality of cattle ears in the heat-sealable compartment or container with a liquid;
    heat-sealing the heat-sealable compartment or container; and
    subjecting the plurality of cattle ears to a hydrostatic pressure of at least 60 psi for at least one minute, whereby the implant is pushed out of the steer ear without damaging said compartment or container or is pulverized during the subjecting step.

2. The method of claim 1, wherein hair that is on the plurality of cattle ears before the subjecting step falls off of the plurality of cattle ears during the subjecting step.

3. The method of claim 1, wherein the implant is pulverized during the subjecting step.

4. The method of claim 1, wherein the item is at least one of a chew, a toy, and a treat.

5. The method of claim 1, wherein the pet is a dog.

6. The method of claim 1, wherein the heat-sealable compartment or container is a nylon bag.

7. The method of claim 1, wherein the liquid is water.

8. The method of claim 1, wherein the hydrostatic pressure is between 60 psi and 85 psi.

9. The method of claim 8, wherein the hydrostatic pressure is one of 60 psi, 75 psi, 80 psi, and 85 psi.

10. A system for manufacturing an item for a pet, comprising:

a plurality of cattle ears, at least one of the plurality of cattle ears containing an implant, removed from a plurality of cattle carcasses;

a liquid, covering the plurality of cattle ears;

a heat-sealable compartment or container, receiving the plurality of cattle ears and the liquid and being heat-sealed after receiving the plurality of cattle ears and the liquid, wherein the compartment or container is no more than two-thirds full of the cattle ears; and a pump, subjecting the plurality of cattle ears to a hydrostatic pressure of at least 60 psi for at least one minute after the heat-sealable compartment or container is heat-sealed, whereby the implant is pushed out of the at least one of the plurality of cattle ears containing an implant without damaging said compartment or container.

11. The system of claim 10, wherein hair on the plurality of cattle ears falls off, or is washed off of the plurality of cattle ears as a result of the hydrostatic pressure.

12. The system of claim 10, wherein the implant in the at least one of the plurality of cattle ears containing an implant is pushed out as a result of the hydrostatic pressure.

13. The system of claim 10, wherein the implant is crushed or pulverized as a result of the hydrostatic pressure.

14. The system of claim 10, wherein the item is at least one of a chew, a toy, and a treat.

15. The system of claim 10, wherein the hydrostatic pressure is between 60 psi and 85 psi.

16. The system of claim 15, wherein the hydrostatic pressure is one of 60 psi, 75 psi, 80 psi, and 85 psi.

17. A method for removing material from a cattle ear containing an implant, comprising:

placing the cattle ear containing the implant in a heat-sealable compartment or container;

covering the cattle ear containing the implant in the heat-sealable compartment or container with a liquid;

heat-sealing the heat-sealable compartment or container; and subjecting the cattle ear containing the implant to a hydrostatic pressure of at least 60 psi for at least one minute whereby the implant is pushed out of the cattle ear without damaging said heat-sealable compartment or container or is pulverized during the subjecting step.

18. The method of claim 17, wherein the material is hair.

19. The method of claim 17, wherein the material is at least one implant.

* * * * *